United States Patent [19]
Weidinger

[11] Patent Number: 5,645,154
[45] Date of Patent: Jul. 8, 1997

[54] FRICTION CLUTCH WITH AUTOMATIC WEAR COMPENSATION

[75] Inventor: Reinhold Weidinger, Unterspiesheim, Germany

[73] Assignee: Fichtel & Sachs AG, Schweinfurt, Germany

[21] Appl. No.: 555,770

[22] Filed: Nov. 9, 1995

[30] Foreign Application Priority Data

Nov. 11, 1994 [DE] Germany ............ 44 40 412.3

[51] Int. Cl.$^6$ .................................................. F16D 13/75
[52] U.S. Cl. ..................... 192/70.25; 192/111 A
[58] Field of Search ............... 192/70.25, 111 A

[56] References Cited

U.S. PATENT DOCUMENTS 5,513,735  5/1996  Uenohara ............ 192/70.25 X
5,513,736  5/1996  Mizukami ............ 192/70.25 X
5,560,463  10/1996  Link et al. ............ 192/70.25

FOREIGN PATENT DOCUMENTS 4239291  5/1993  Germany .
4306688  11/1993  Germany .
4412107  11/1994  Germany .
2261922  6/1993  United Kingdom .
2264989  9/1993  United Kingdom ............ 192/111 A Primary Examiner—Rodney H. Bonck
Attorney, Agent, or Firm—Nils H. Ljungman and Associates

[57] ABSTRACT

A membrane or plate spring clutch on which there is an automatic wear adjustment mechanism, which wear adjustment mechanism takes into consideration only a portion of the wear which has occurred, and guarantees the required application force on the friction linings of the clutch disc, so that the torque transmission capability of the friction clutch remains constant over its entire useful life.

17 Claims, 5 Drawing Sheets

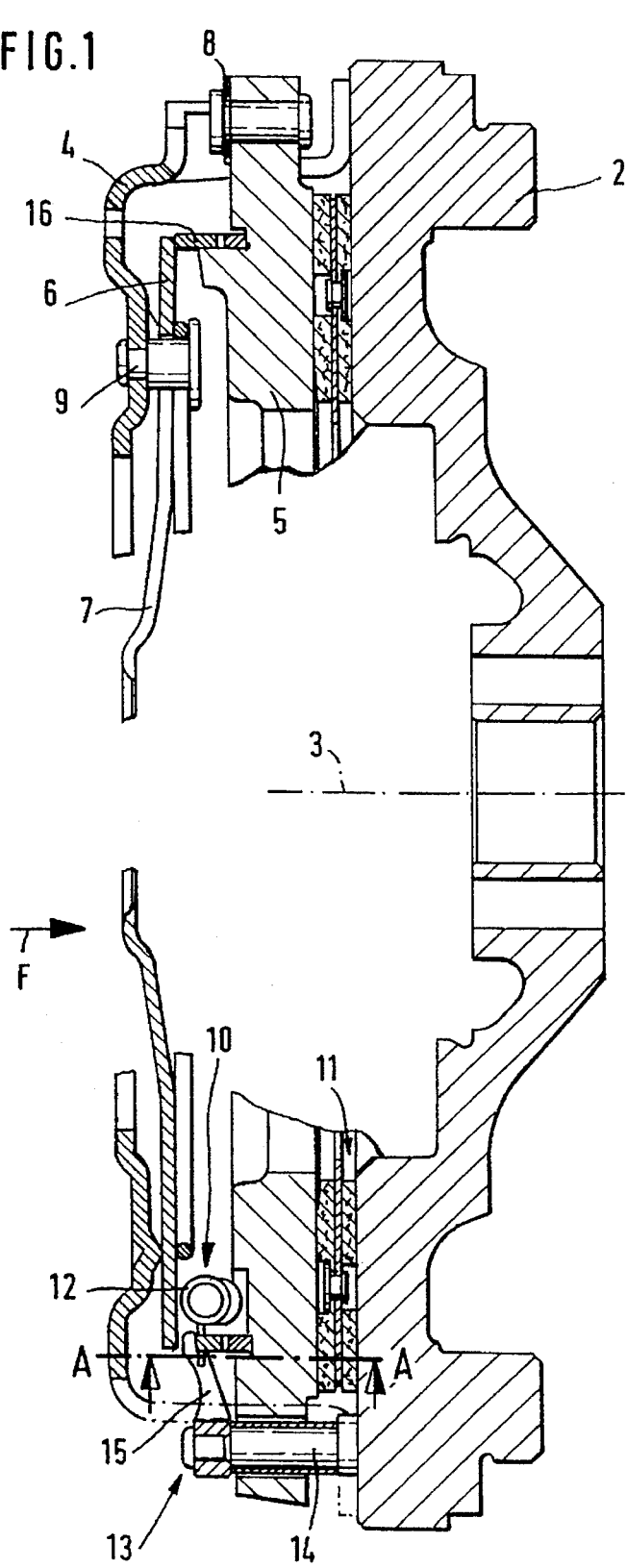
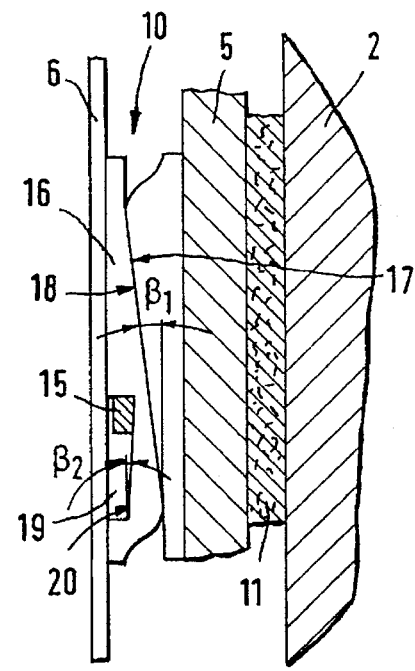
FIG. 1
FIG. 2
A-A

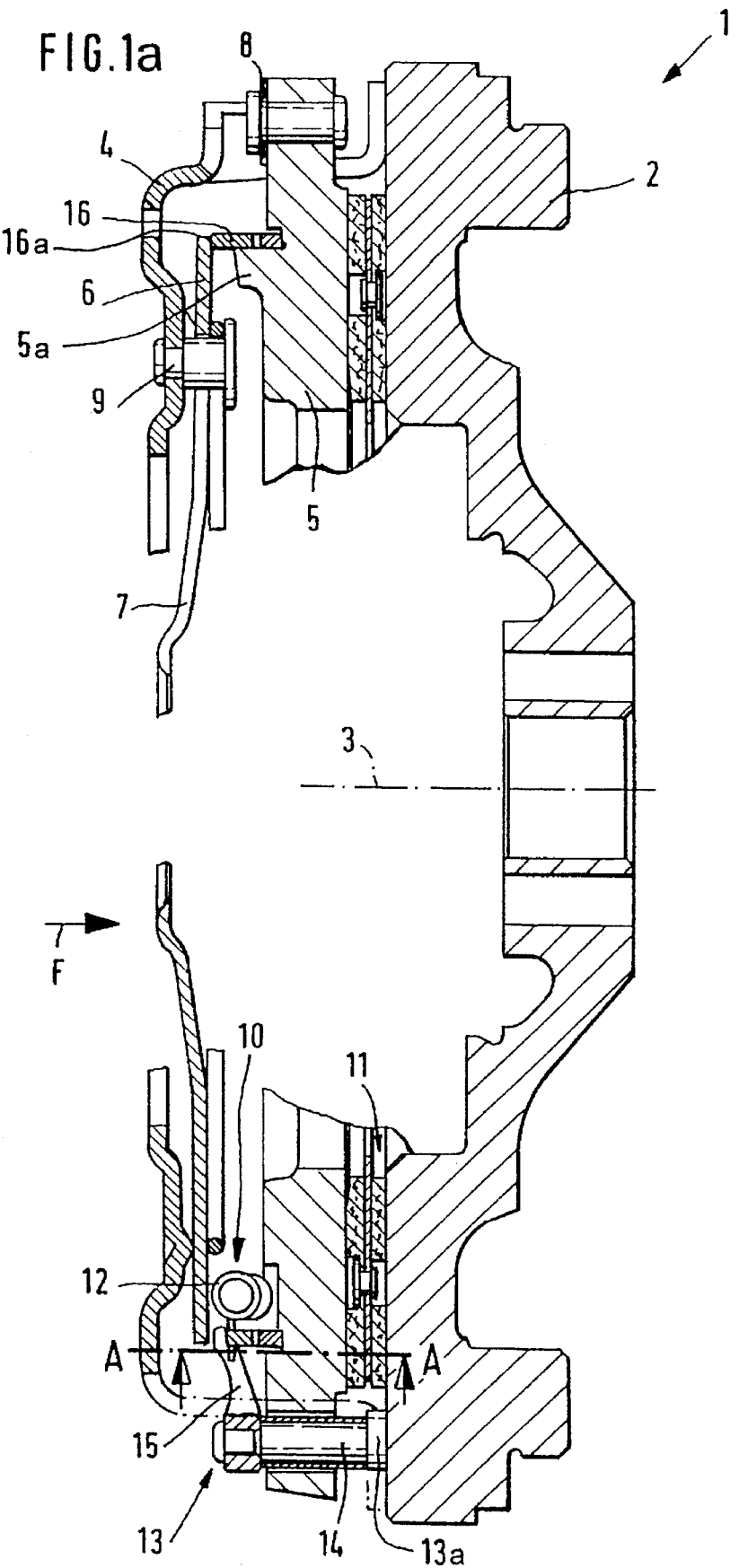

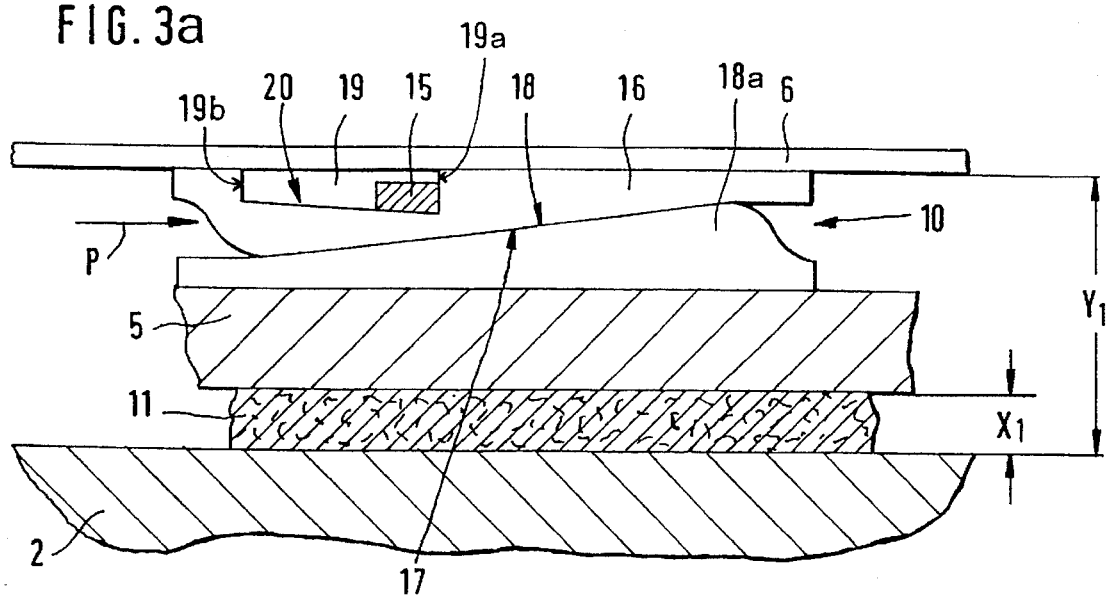

FRICTION CLUTCH WITH AUTOMATIC WEAR COMPENSATION

BACKGROUND OF THE INVENTION

1. Field of the Invention

The present invention generally relates to a membrane or plate spring clutch, in particular, for a motor vehicle. The membrane or plate spring clutch includes a flywheel fastened to the crankshaft of an internal combustion engine, which flywheel defines an axis of rotation. The membrane or plate spring clutch also includes an application plate, which application plate is non-rotational in relation to the flywheel, yet the application plate can be displaced axially. There is a clutch disc with friction linings located between the application plate and the flywheel. The membrane or plate spring clutch also includes a membrane or plate spring to apply pressure to the application plate toward the flywheel. In addition, there is a retracting device for the application plate, as well as a mechanism for the automatic adjustment of the membrane or plate spring as a function of the wear of the friction linings.

2. Background Information

There are numerous conventional friction clutches which have an automatic wear compensation mechanism. For example, Unexamined German Patent Applications 43 06 688 and 44 12 107 disclose that, in the area of the contact between the membrane or plate spring and the application plate, adjustment elements with diagonal surfaces can be inserted which, when wear occurs, re-establish the original position of the membrane or plate spring in relation to the housing to keep both the position and the application force constant.

OBJECT OF THE INVENTION

The object of the present invention is to significantly improve a clutch of the type described above so that the amount of torque which can be transmitted over the entire useful life of the clutch assembly remains essentially constant.

SUMMARY OF THE INVENTION

The present invention teaches that this object can be accomplished by determining the magnitude of the wear adjustment as a function of the application force required on the application plate. Because the magnitude of the wear adjustment is defined as a function of the application force required on the application plate, all the factors can be taken into consideration, which factors can have an influence on the transmission of torque within the clutch during operation. An important role in this process can be played by the characteristics of the retracting springs, which retracting springs can apply pressure to the application plate during the retracting process. Since over time, the application plate can move closer to the flywheel as a result of wear, which wear can occur on the friction linings, the forces exerted by the retracting springs on the application plate can also change. This change can be taken into consideration in the system of the present invention. It is also known that membrane springs can exhibit setting losses over time, which are known, and which can also be taken into consideration. It is also known that certain friction linings on the clutch plate can be subject to fluctuations in the coefficient of friction over their useful life. Such influences can also be taken into consideration.

The present invention also teaches that the magnitude of the wear adjustment can preferably be less than the magnitude of the actual wear, which wear can occur to the friction linings. This measure can take into consideration the fact that the forces of the retracting springs of the application plate can increase with increasing wear. This increase in force, which can counteract the application force of the membrane or plate spring, can be compensated by setting the magnitude of the wear adjustment to essentially correspond to the force actually needed to overcome the retracting springs. For essentially complete compensation of the wear distance, the plate or membrane spring could preferably retain its force corresponding to its original installed position, and the application force could thus decrease. Since normally, the membrane or plate spring can be operated in the descending branch of the spring characteristic of the membrane or plate spring, the only partial compensation of the actual wear can make it possible to achieve an increase in the spring force, which increase in the spring force can correspond to the increase in the force of the retracting springs.

The present invention also teaches that there can preferably be a mechanism which can detect the magnitude of the actual wear, and which mechanism can essentially determine, by translation, the magnitude of the wear adjustment to be made. The translation ratio can thereby be fixed, but it can also be possible to make the translation ratio variable over essentially the entire wear, corresponding to the requirements which can occur on the special friction clutch.

According to another feature of the present invention on a friction clutch, the retraction mechanism can include a spring mechanism, which spring mechanism can have a spring force that can increase in the engagement direction. The retraction mechanism can also include a wear adjustment mechanism, which wear adjustment mechanism can act by means of diagonal surfaces. The diagonal surfaces can be displaced relative to one another, by means of which, on one hand, the application forces originating from the membrane spring or plate spring can be transmitted to the application plate. The adjustment movement of the diagonal surfaces can, on the other hand, be limited by clearance sensors. The present invention teaches that the wear adjustment mechanism can include an adjustment mechanism, which adjustment mechanism can have a diagonal surface opposite a corresponding mating surface of the application plate. The adjustment mechanism can have a contour opposite the clearance sensor. The ascending slopes or inclinations of the diagonal surface and contour can be different from one another, such that the magnitude of the wear adjustment with respect to the membrane or plate spring can be less than the magnitude of the actual wear. As a result of the design, in accordance with an embodiment of the present invention, it can be possible, as a function of the inclination of the diagonal surfaces, and taking into consideration the contour opposite the clearance sensor, to make an adjustment for wear, which adjustment for wear can correspond to the requirements of the application force required on the friction linings. The required mechanisms can have a simple design and can be relatively easy to manufacture.

The present invention also teaches that the adjustment element can be designed in the form of a ring element. The ring element can be oriented concentric to the axis of rotation. The ring element can rotate and the force of a spring can be applied to the ring element. Preferably by means of a multiplicity of diagonal surfaces distributed around the circumference of the ring element, the ring element can be in contact with corresponding mating surfaces of the application plate. The ring element can have a discontinuous and concentric contact surface for the plate or membrane spring. Areas of the clearance sensors can be located in the discontinuities of the ring element whereby contours, which contours can point in the circumferential direction, can be provided in the gaps opposite the stop levers of the clearance sensors. The contours can be designed with a slope, which slope can preferably be opposite to the slope of the diagonal surfaces. As a result of this configuration of the ring element, it can be possible, by a corresponding adjustment of the slope of the contours in the ring element, to effect an essentially partial wear adjustment. The slope of the diagonal surfaces can thereby be essentially defined by their function (self locking by friction essentially when the clutch is engaged), while the slope of the contours can be designed as a function of the application force required.

It can thereby be possible to realize the contours in the gaps of the ring element in the form of a straight line, with regard to a uniform wear adjustment over essentially the entire useful life of the clutch linings. But it can also be possible to realize the contours with a slope, which slope can differ over the circumference of the contours, whereby influences besides the change of the application force of the release springs can be taken into consideration.

When the word invention is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and in the event that there is more than one invention, that these inventions may be patentable and non-obvious one with respect to the other.

One aspect of the present invention resides broadly in a friction clutch for a motor vehicle with automatic compensation for wear, the friction clutch comprising: a clutch housing; a clutch disc for being disposed on a transmission input shaft having a longitudinal axis, the clutch disc being axially movable along the transmission input shaft; a pressure plate for engaging and disengaging the clutch disc with a flywheel; first means for axially moving the pressure plate with respect to the transmission input shaft; the clutch disc comprising: friction linings disposed between the pressure plate and the flywheel for contacting the flywheel and the pressure plate upon engagement of the clutch disc; second means for axially moving the pressure plate; the second means for axially moving the pressure plate comprising means for moving the pressure plate means away from the flywheel; the second means for axially moving the pressure plate comprising a first portion for receiving a force from a clutch release mechanism; the second means for axially moving the pressure plate comprising a second portion; the second portion of the second means for axially moving the pressure plate being disposed to operatively generate a force on the pressure plate; wear compensation means comprising means for adjusting the second portion of the second means for axially moving the pressure plate to substantially maintain a substantially constant force of the pressure plate on the friction linings upon wear of the friction linings.

Another aspect of the present invention resides broadly in a friction clutch for a motor vehicle, the friction clutch comprising: a clutch housing; a clutch disc for being disposed on a transmission input shaft having a longitudinal axis, the clutch disc being axially movable along the transmission input shaft; a pressure plate for engaging and disengaging the clutch disc with a flywheel; first means for axially moving the pressure plate with respect to the transmission input shaft; the first means for axially moving the pressure plate comprising means for generating a retracting force on the pressure plate in the axial direction away from the flywheel; the clutch disc comprising: friction linings disposed between the pressure plate and the flywheel for contacting the flywheel and the pressure plate upon engagement of the clutch disc; second means for axially moving the pressure plate; the second means for axially moving the pressure plate comprising means for moving the pressure plate away from the flywheel; the second means for axially moving the pressure plate comprising a first portion for receiving a force from a clutch release mechanism; the second means for axially moving the pressure plate comprising a second portion; the second portion of the second means for axially moving the pressure plate being disposed to operatively generate a force on the pressure plate; the second means for axially moving the pressure plate comprising means for adjusting the second portion of the second means for axially moving the pressure plate to compensate for an increase in the retracting force of the first means for axially moving the pressure plate; and the means for adjusting the second portion of the second means for axially moving the pressure plate to substantially maintain the force of the pressure plate on the friction linings upon wear of the friction linings.

Yet another aspect of the present invention resides broadly in a friction clutch for a motor vehicle with automatic compensation for wear, the friction clutch comprising: a clutch housing; a clutch disc for being disposed on a transmission input shaft having a longitudinal axis, the clutch disc being axially movable along the transmission input shaft; a pressure plate for engaging and disengaging the clutch disc with a flywheel; first means for axially moving the pressure plate with respect to the transmission input shaft; the clutch disc comprising: friction linings disposed between the pressure plate and the flywheel for contacting the flywheel and the pressure plate upon engagement of the clutch disc; second means for axially moving the pressure plate; the second means for axially moving the pressure plate comprising means for moving the pressure plate away from the flywheel; the second means for axially moving the pressure plate comprising a first portion for receiving a force from a clutch release mechanism; the second means for axially moving the pressure plate comprising a second portion; the second portion of the second means for axially moving the pressure plate being disposed to operatively generate a force on the pressure plate; wear compensation means comprising means for permitting adjustment of the position of the second portion of the second means for axially moving the pressure plate; and the means for permitting adjustment of the position of the second portion of the second means for axially moving the pressure plate comprising means for compensating for less than the total wear of the friction linings.

BRIEF DESCRIPTION OF THE DRAWINGS

The present invention is explained in greater detail below with reference to the accompanying drawings, in which:

FIG. 1 shows a longitudinal section through a clutch;

FIG. 1a shows the same view as shown in FIG. 1 only with additional components;

FIG. 2 shows cross section A—A in FIG. 1;

FIG. 3a shows the same view as shown in FIG. 3 only with additional components.

DESCRIPTION OF THE PREFERRED EMBODIMENT

Figure 3:
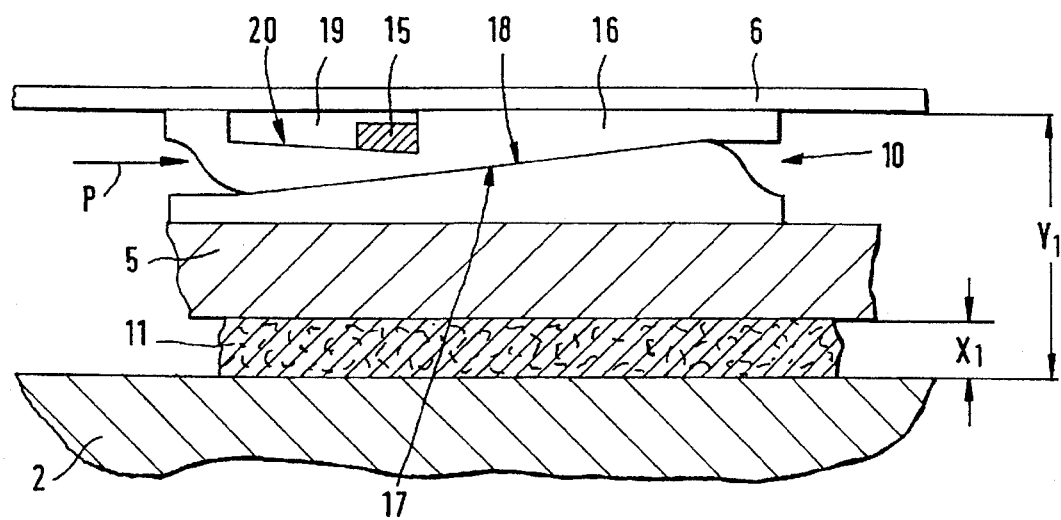
FIGS. 3–5 show details of FIG. 2 in different operating conditions, on an enlarged scale.

FIG. 1 shows a membrane spring clutch 1 in cross section. A flywheel 2 can be fastened to a crankshaft (not shown) of an internal combustion engine, which flywheel 2 can rotate with the crankshaft around an axis of rotation 3. A clutch housing 4 can be fastened to the flywheel 2, which clutch housing 4 can include an application plate 5 and a membrane spring 6. The application plate 5 can be mounted non-rotationally with respect to the clutch housing 4, and therefore the application plate 5 can be mounted non-rotationally also with respect to the flywheel 2. The application plate 5 can, however, be displaced axially, namely in this case by means of tangential leaf springs 8. The tangential leaf springs 8 can extend approximately tangentially and can also exert a retraction force on the application plate 5, namely in the direction away from the flywheel 2.

Friction linings 11 of a clutch disc can be located between the application plate 5 and the flywheel 2. The membrane spring 6 can be located between the application plate 5 and the clutch housing 4, such that the membrane spring 6 can be supported by means of an intermediate diameter on the clutch housing 4, and the membrane spring 6 can be held by means of several spacer bolts 9 distributed over the circumference of the clutch housing 4. The membrane spring 6 can be in contact by means of its outside diameter, with the interposition of a wear adjustment mechanism 10, with the application plate 5. The membrane spring 6 can have flexible tabs or tongues 7, which flexible tabs 7 can point radially inward. The flexible tabs 7 can be actuated by means of a release system not shown here, but which release system would be well known to one of ordinary skill in the art. The release system can act in the direction indicated by the arrow F on the flexible tabs 7. Alternatively, instead of the membrane spring 6, a plate spring can be used, of course, in which case a separate lever system should be provided to release the friction clutch.

In accordance with one embodiment of the present invention, the application plate 5 can include an extended portion 5a (see FIG. 1a), which extended portion 5a can be located radially inside a ring element 16. The ring element 16 can preferably be connected adjacent to the extended portion 5a such that the ring element 16 can be located between the membrane spring 6 and the application plate 5. The ring element 16 can have a contact point 16a, as shown in FIG. 1a, which contact point 16a can face toward the membrane spring 6 to provide a contact surface for the membrane spring 6, so that the membrane spring 6 can cause the application plate 5 to engage the clutch disc.

The wear adjustment mechanism 10 is explained in greater detail below with reference to FIG. 2. The wear adjustment mechanism 10 can include the ring element 16, which ring element 16 can be oriented concentric to the axis of rotation 3. The ring element 16 can preferably be clamped between the application plate 5 and the membrane spring 6.

As shown in FIG. 2, there can be several diagonal surfaces 17 distributed around the circumference of the ring element 16. By means of the diagonal surfaces 17, the ring element 16 can be in contact with corresponding mating surfaces 18 of the application plate 5. In this case, of course, a separate component is shown to illustrate the mating surfaces 18, but in any case, this separate component can preferably be connected firmly to the application plate 5. The slope of the diagonal surfaces 17 and mating surfaces, 18 at the angle $\beta_1$ can be defined such that when the clutch is engaged, when the ring element 16 is applied by the force of the membrane spring 6 against the mating surfaces 18, a relative rotation can be prevented by an automatic interlock. The mechanism 10 can also include one or more springs 12, which springs 12 can apply a force peripherally to the ring element 16. The force applied by the springs 12 can attempt to increase the distance between the outside circumference of the membrane spring 6 and the application plate 5.

In summary, in accordance with one embodiment of the present invention, the circumference of the ring element 16 can preferably include diagonal surfaces 17, which diagonal surfaces 17 can essentially form a slope. The slope of the diagonal surfaces 17 of the ring element 16 can correspond to the slope of the mating surfaces 18 of the separate component 18a (see FIG. 3a) connected to the application plate 5. Both the slope of the diagonal surfaces 17 and the slope of the mating surfaces 18 of the separate component 18a can preferably be inclined at the angle $\beta_1$ with respect to the surface of the application plate 5, as shown in FIG. 2. When the clutch is engaged, the diagonal surfaces 17 of the ring element 16 can be in contact with, and essentially interlocked with, the mating surfaces 18 of the component 18a connected to the application plate 5. In addition to the ring element 16, the wear adjustment mechanism 10 can also include the springs 12, which springs 12 can essentially rotate the ring element 16 with respect to component 18a upon wear of the friction linings 11. When the ring element 16 is rotated, the distance can be increased between the membrane spring 6 and the application plate 5 thereby compensating for the wear of the friction linings 11.

In accordance with one embodiment of the present invention, the diagonal surfaces 17 and the mating surfaces 18 can include essentially smooth surfaces. Alternatively, the diagonal surfaces 17 and the mating surfaces 18 can be other than straight or smooth surfaces. For example, the diagonal surfaces 17 and the mating surfaces 18 could include individual matching steps or individual shoulders designed to correspond to and fit into one another, for example, as discussed hereinbelow with reference to FIG. 3b'.

There can also be several clearance sensors 13 distributed on the circumference of the membrane spring clutch 1. Each of the clearance sensors 13 can have a spacer bolt 14 and each bolt 14 can be parallel to the axis of rotation 3. The bolt 14 can come into contact by means of a head on a surface of the flywheel 2. Each clearance sensor 13, on the side of the application plate 5 farther from the flywheel 2, can also have a stop lever 15, which stop lever 15 can point essentially radially inward. The stop lever 15, essentially without being influenced by the membrane spring 6, can be in contact against the ring element 16. When the clutch is released, the stop lever 15 can essentially prevent an unintentional twisting by the springs 12 by means of an axial stop. Each stop lever 15 can thereby extend into a corresponding gap 19 in the ring element 16, and the ring element 16 can be in contact by means of a contour 20 of the gap 19 with the stop lever 15, namely on the side of the stop lever 15, which side can be closer to the application plate 5.

In summary and in accordance with one embodiment of the present invention, the wear adjustment mechanism 10 can also include the clearance sensors 13, which clearance sensors 13 can be distributed along the outer circumference of the membrane spring clutch 1. Each clearance sensor 13 can have a bolt 14, which bolts 14 can come into contact with the surface of the flywheel 2 by means of a head 13a (see FIG. 1a). In addition to the bolts 14, each clearance sensor 13 can also include a stop lever 15, which stop levers 15 can extend radially inward whereby the inner ends of the stop levers 15 can come into contact with the ring element 16. The side of the ring element 16 closer to the membrane spring 6 can include a gap or notch 19, which gap 19 can have a contour 20. The contour 20 can be located on the side of the gap 19 facing toward the application plate 5. Each stop lever 15 of the corresponding clearance sensors 13 can thus extend in a radially inward direction whereby the stop levers 15 can extend into the corresponding gap 19. As a result, the stop levers 15 can be in contact with the contour 20 of the gap 19 of the ring element 16. When the clutch 1 is disengaged, the contact of the stop lever 15 with the ring element 16 can thereby essentially form a stop in the axial direction whereby the rotation of the ring element 16 can essentially be prevented, The contour 20 of the gap 19, as in the illustrated embodiment as shown in FIG. 2, can be designed in the form of a straight line with an inclination, which inclination can correspond to the angle $\beta_2$, whereby this inclination can be in the opposite direction to the inclination of the diagonal surfaces 17 and the mating surfaces 18 at the angle $\beta_1$. It can, however, also be possible that the contour 20 can be designed not in the form of a straight line, but in the form of a curve, depending on the desired action of the clutch. In that case, however, over essentially the entire wear distance, the inclination of the contour 20 can preferably extend opposite to the inclination of the diagonal surfaces 17 and the opposite surfaces 18.

In accordance with one embodiment of the present invention, the ring element 20 can have gaps or notches 19, which gaps or notches 19 can have a contour 20. The contour 20 of the gap or notch 19 can be in the form of a straight line inclined at the angle $\beta_2$ with respect to the surface of the application plate 5. The angle $\beta_2$ of the contour 20 can preferably permit the adjustment for wear to be slightly less than the amount of actual wear of the friction linings 11. For this purpose, the angle $\beta_2$ of the contour 20 can preferably have an inclination in a direction opposite to the inclination of the angle $\beta_1$ of the diagonal surfaces 17 and of the mating surfaces 18. Alternatively, the contour 20 can be in the form of a curve, which curve can preferably extend in a direction opposite the direction of the angle $\beta_1$ of the diagonal surfaces 17 and the mating surfaces 18. The gap 19 can have ends 19a and 19b, as shown in FIG. 3a, and the length of end 19a can preferably be greater than the length of end 19b. The length of the gap 19, i.e. the distance between the ends 19a and 19b, can preferably provide a stop such that when the friction linings 11 are essentially completely worn, the stop lever 15 can contact the end 19b to thereby stop additional rotation of the ring element 16 and thereby prevent further adjustment for the wear. As a result, the clutch pedal can preferably move to a top position thereby providing a warning of advanced wear of the friction linings 11.

Figure 6:
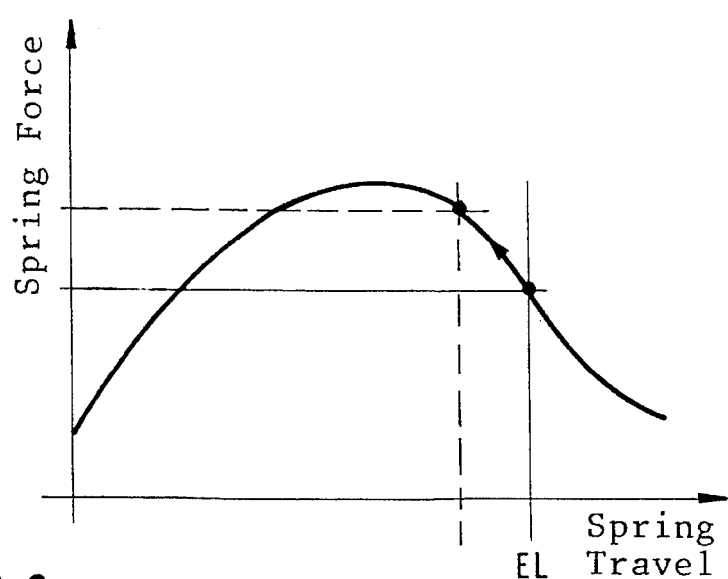
FIG. 6 shows the spring force curve as a function of wear.

The schematic curve of a wear compensation process is illustrated in FIG. 6, with reference to FIGS. 1 and 2. FIG. 6 shows the typical curve of the force of a membrane spring 6, whereby over the spring travel, the spring force can initially increase, can reach a maximum and can then decrease again. Normally, the membrane springs in friction clutches can be installed so that when the clutch is new, the membrane spring 6 can be in an installed position (EL), which installed position (EL) can lie on the descending branch of the curve.

In conventional friction clutches which are not equipped with a wear adjustment mechanism, the membrane spring 6 can change its installed position as the friction linings 11 become worn, and thus the force exerted by the membrane spring 6, as indicated by the arrow in FIG. 6, can also change. It can thereby be essentially guaranteed that the application force can essentially always be sufficiently large, even if the friction linings 11 are worn. On a conventional friction clutch which has an automatic wear adjustment mechanism, provisions can be made so that the installed position of the membrane spring 6 can be kept absolutely constant, and thus the spring force of the membrane spring can also be kept constant. The installed position shown as EL can be maintained. In the design of the present invention, however, there can be a wear adjustment mechanism 10, which wear adjustment mechanism 10 can act, to the extent indicated above, on the installed position of the membrane spring 6. Since, for example, as the amount of wear on the friction linings 11 increases, the application plate 5 can move closer to the flywheel 2, the bias force of the tangential leaf springs 8, which bias force can be used as the release force, can thereby increase. In accordance with one embodiment, the biasing force of the leaf springs 8 can increase due to the "stretching" of the leaf springs 8 as the application plate 5 moves closer to the flywheel 2. Since this release force can counteract the application force of the membrane spring 6, the application force which can act on the friction linings 11 could essentially decrease over the life of the friction clutch, and the clutch could lose its full ability to transmit torque. Therefore the wear adjustment mechanism 10 can be designed so that it essentially does not make a one hundred per cent compensation for the wear, but essentially only an adjustment for the wear.

In summary, therefore, in conventional friction clutches designed without mechanisms to adjust for wear of the friction linings 11, the installed position (EL) of the membrane spring 6 can change. As a result, the application force or spring force of the membrane spring 6 can change, as indicated by the arrow in FIG. 6. On the other hand, conventional friction clutches with mechanisms to adjust for wear can keep the installed position (EL) of the membrane spring 6 constant. The spring force or application force of the membrane spring 6 can thereby be kept constant and the installed position (EL) of the membrane spring 6 can be maintained in a conventional friction clutch. In contrast to these conventional friction clutches, in accordance with one embodiment, the membrane spring clutch 1 of the present invention can have a wear adjustment mechanism 10, which wear adjustment mechanism 10 can act on and can change the installed position (EL) of the membrane spring 6. Upon increasing wear to the friction linings 11, the application plate 5 can move toward the flywheel 2 by an amount essentially corresponding to the amount of wear to the friction linings 11. In addition, upon wear, the biasing force of the tangential leaf springs 8 can, however, exert an increasing force on the application plate 5 in the direction away from the flywheel 2. As a result, the biasing force of the tangential leaf springs 8 can, at least partially, counteract the application force of the membrane spring 6 on the application plate 5. Upon additional wear of the friction linings 11, therefore, the wear adjustment mechanism 10 can essentially prevent the biasing force of the tangential leaf springs 8 from decreasing the application force of the membrane spring 6 on the application plate 5. As a result of the wear adjustment mechanism 10, the application force of the application plate 5 onto the friction linings 11 can thus correspondingly increase such that the membrane spring clutch 1 can essentially engage the clutch disc. The wear compensation mechanism 10 can therefore preferably only compensate for only a portion of the wear of the friction linings 11. Thus, the wear adjustment mechanism 10 of the membrane spring clutch 1 can preferably provide only a relative adjustment for the wear.

The adjustment can be accomplished when the stop levers 15 in the gaps 19 of the ring element 16 interact with the contour 20. If the contour 20 is linear, the contour 20 can preferably be at an angle $\beta_2$, as shown in FIG. 2, with respect to the plane of the friction surface of the application plate 5. The inclination of the contour 20 can essentially guarantee that during each adjustment procedure, the ring element 16 can essentially compensate for only a portion of the wear which has occurred on the friction linings 11. As a result, as shown in FIG. 6, the installed position (EL) of the membrane spring 6 can change slightly with increasing wear, namely in the direction of the arrow in FIG. 6. Thus the force exerted by the membrane spring 6 on the application plate 5 can increase, for example by the amount by which the release force of the tangential leaf springs 8 can essentially increase. In this manner, essentially the same application force can be available over the entire range of wear of the friction linings 11, so that the amount of torque which can be transmitted by the friction clutch can remain essentially uniform.

In accordance with one embodiment of the present invention, therefore, upon wear of the friction linings 11, the wear adjustment mechanism 10 can accordingly adjust for the wear by means of the stop levers 15, which stop levers 15 can extend into the corresponding gaps 19 of the ring element 16. The contour 20 of the gap 19 can preferably be inclined at the angle $\beta_2$ with respect to the surface of the application plate 5. As a result of the angle $\beta_2$ of the contour 20, the stop lever 15 can be in contact with a portion of the contour 20 corresponding to the amount of wear of the friction linings 11. The stop lever 15 can, therefore, be in contact with the contour 20 and, as wear occurs, the stop lever 15 can essentially be moved along the angle $\beta_2$ of the contour 20. The angle $\beta_2$ of the contour 20 can thereby provide an adjustment of the ring element 16 essentially corresponding to the amount of wear of the friction linings 11. Thus, upon increasing wear, the installed position (EL), as shown in FIG. 6, of the membrane spring 6 can change such that the application force of the membrane spring 6 on the application plate 5 can increase. The increase in the application force of the membrane spring 6 can correspond to the increase in the biasing force of the tangential leaf springs 8 on the application plate 5. As a result, the amount of torque transmitted over the life of the membrane spring clutch 1 can remain essentially constant.

The individual steps of the wear adjustment are explained in detail below with reference to FIGS. 3–5.

FIG. 3 illustrates the condition of the friction clutch or membrane spring clutch 1 illustrated in FIGS. 1 and 2, when the friction clutch 1 is new. As shown in FIG. 3, the unworn friction linings 11 can have a lining thickness $X_1$, whereby this distance of $X_1$ can simultaneously be the distance between the application plate 5 and the flywheel 2. The distance between the flywheel 2 and the membrane spring 6, in the radially outer area of the membrane spring 6, can therefore be of the magnitude $Y_1$. The ring element 16 can thereby be installed so that against the force of the spring 12, i.e. against the force P, the ring element 16 can be in contact, with the gap 19, against the stop lever 15. Simultaneously, the stop lever 15 can be in contact with the contour 20. When the friction linings 11 are new, it can also be essentially guaranteed that each clearance sensor 13 can be in contact with its respective bolt 14 on a surface which can be fixed to the clutch housing 4, in this case, the bolt 14 can be in contact with the flywheel 2.

Figure 4:
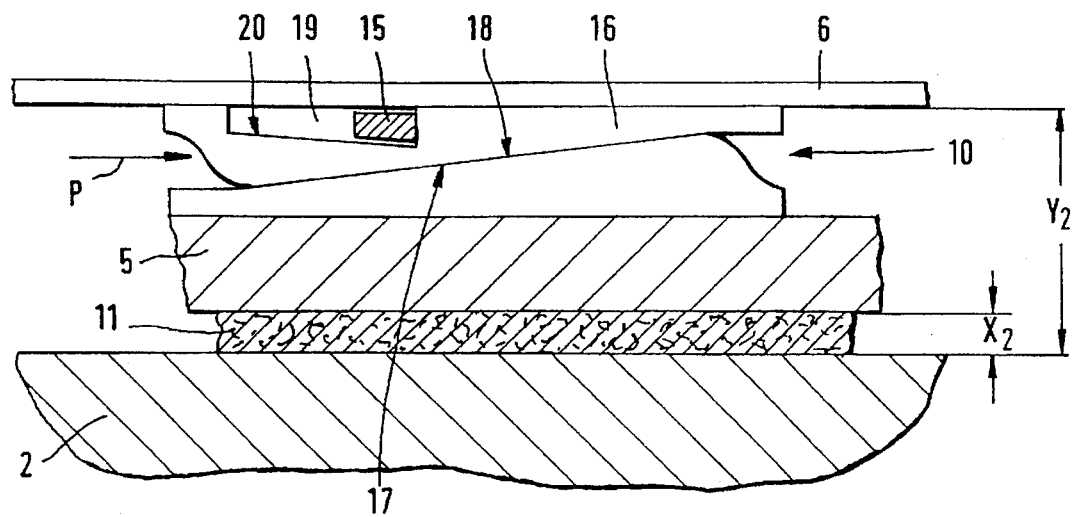
Figure 5:
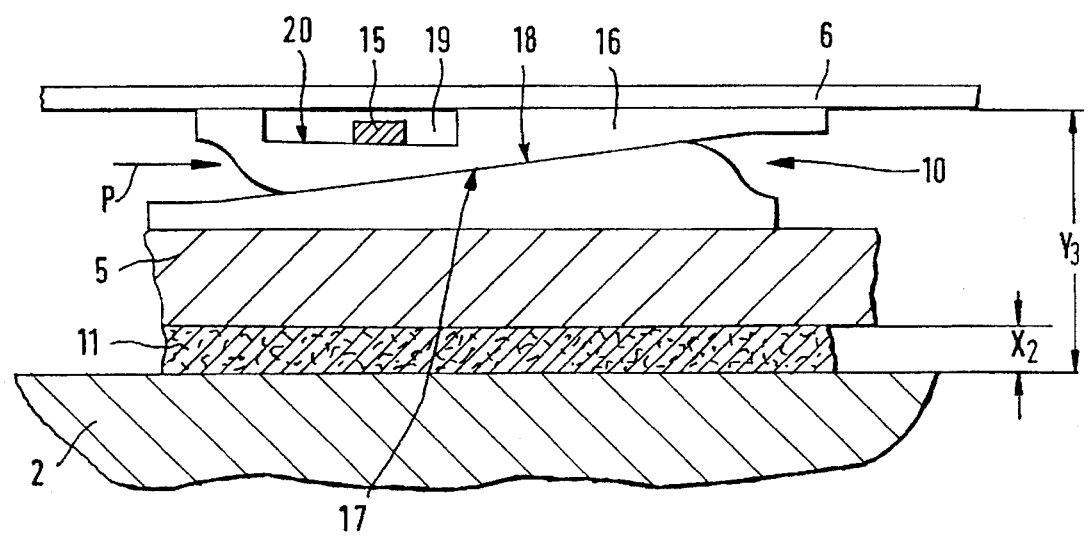

During the initial engagement process when the clutch is new, during which wear can occur to the friction linings 11, there can be a situation such as the one illustrated in FIG. 4. The thickness of the friction linings 11 has essentially decreased, as shown in FIG. 4, to the value $X_2$, whereby $X_2$ can preferably be less than $X_1$, as shown in FIG. 3. Each of the stop levers 15 can move away from the contour 20 of the gap 19 by this amount, namely toward the membrane spring 6, but without touching the membrane spring 6.

It should be noted that the distance $Y_2$ between the membrane spring 6 and the flywheel 2 can also preferably be less than $Y_1$ (as shown in FIG. 3) by the same amount as the difference between $X_1$ and $X_2$. In particular, as the friction linings 11 become worn, essentially all the components 5, 16, 6 can be moved closer to the flywheel 2. There can preferably be a frictional connection between the application plate 5 and the bolt 14. When the application plate 5 moves closer to the flywheel 2, the application plate 5 can move along bolt 14 by means of the frictional connection therebetween, whereas the stop lever 15 can preferably remain in essentially the same position. During the subsequent clutch release, the membrane spring 6 can act by means of a release system with a force in the direction indicated by the arrow F on the flexible tabs 7, as shown in FIG. 1, so that the membrane spring 6 can tip around the spacer bolts 9. In the vicinity of the outside diameter of the membrane spring 6, the membrane spring 6 can reduce the contact force on the ring element 16. The spring system with the spring 12 can then, by means of the spring force P, rotate the ring element 16 with respect to the application plate 5 or the membrane spring 6, namely against the force of the tangential leaf springs 8, which tangential leaf springs 8 can function as release springs. This relative rotation of the ring element 16 can be continued until the gaps 19 can essentially come into contact, with the contour 20, against the stop lever 15. Under these operating conditions, the clearance sensors 13 can be stopped in their position by the forces acting on the clearance sensors 13 (spring force P of spring 12 via contour 20), and the magnitude of the wear adjustment can then be a function essentially only of the inclination of the contours 20. The final status, after the adjustment process and after the removal of the release force as indicated by the arrow F, is illustrated in FIG. 5. In that case, the clutch can once again be completely engaged, and the ring element 16 can be rotated with respect to the application plate 5 or the membrane spring 6 by a specified distance in the direction indicated by the arrow P by the force of the springs 12. Thus the membrane spring 6 can be at a distance from the flywheel 2 which has the value $Y_3$, whereby $Y_3$ can preferably be greater than $Y_2$ and less than $Y_1$.

In summary, in accordance with one embodiment of the present invention, the adjustment for wear can occur as follows: Before wear, the friction linings 11 can have a thickness $X_1$. Upon wear, the thickness of the friction linings 11 can be reduced to the value $X_2$, as shown in FIG. 4. As wear occurs, the application plate 5, the ring element 16, and the membrane spring 6 can each move toward the flywheel 2. The spring force characteristic of the application force of the membrane spring 6 on the application plate 5 can thereby be changed. Upon wear, when the clutch disengages, the application force of the membrane spring 6 can be essentially reduced with respect to the spring 12. To essentially maintain the application force of the membrane spring 6 on the application plate 5, the wear adjustment mechanism 10 can preferably adjust for the wear by means of the spring 12 of the wear adjustment mechanism 10. When the application force of the membrane spring 6 is essentially reduced with respect to the spring 12, the spring 12 can be free to apply a force on the ring element 16 to thereby rotate the ring element 16 in the direction of the arrow P. The slope of the diagonal surfaces 17 can thereby be moved correspondingly with respect to the slope of the mating surfaces 18, to increase the axial distance between the membrane spring 6 and the application plate 5. The stop levers 15 can thus be essentially moved away from the contour 20 of the corresponding gap 19. The slope or angle $\beta_2$ of the contour 20 can preferably be a function of the application force required of the membrane spring 6 on the application plate 5 upon increasing wear. The ring element 16 can thus rotate until the stop levers 15 can come into contact with the contours 20 of the gaps 19 of the ring element 16. The contact between the contour 20 and the corresponding stop lever 15 can provide a stop for the rotation of the ring element 16. Upon additional wear of the friction linings 11, the application plate 5, along with the ring element 16 and the membrane spring 6, can again move slightly closer to the flywheel 2. The stop levers 15 can thereby come into contact with another portion of the contour 20 to thereby stop the additional rotation of the ring element 16 thus permitting the adjustment for wear to correspond approximately to the amount of the actual wear of the friction linings 11 while not fully compensating for the amount of wear.

In accordance with one embodiment of the present invention, upon wear of the friction linings 11, the increase in the retracting force of the tangential leaf springs 8 on the application plate 5 away from the flywheel 2 can essentially be compensated for by the increase in the application force of the membrane spring 6 on the application plate 5 toward the flywheel 2. Upon additional wear, the wear adjustment mechanism 10 can again adjust the position of the membrane spring 6 such that the increase in the application force of the membrane spring 6 can compensate for the increased retracting force of the tangential leaf springs 8. When the membrane spring 6 is adjusted from the installed position (EL), as shown in FIG. 6, the application force of the membrane spring 6 can increase up to a certain point of adjustment, which increase is indicated by the arrow in FIG. 6. The wear adjustment mechanism 10 can preferably maintain the point of the increased force of the membrane spring 6, away from the installed position (EL), upon wear, to thus essentially counteract the increase in the retracting force of the tangential leaf springs 8. As a result of the contour 20 of the gap or notch 19, the ring element 16 can essentially rotate lesser amounts upon each successive amount of wear to permit the membrane spring 6 to adjust for the wear, yet not fully compensate for the wear.

In accordance with one embodiment of the present invention, since the force of the tangential leaf springs 8 can increasingly retract the application plate 5 away from the flywheel 2 upon greater and successive wear, the application plate 5 essentially cannot completely travel toward the flywheel 2 upon wear. Since the tangential leaf springs 8 can increasingly retract the application plate 5 away from the flywheel 2 upon increasing wear, the adjustment of the position of the membrane spring 6 can preferably correspondingly slightly decrease upon greater wear. For this reason, the contour 20 can have the angle $\beta_2$ to permit the membrane spring 6 to adjust slightly less upon each successive increase in wear. Due to the spring force characteristics of the membrane spring 6, the membrane spring 6 can thus preferably maintain essentially the same application force on the application plate 5 throughout the useful life of the membrane spring clutch 1. Upon greater wear, therefore, there can preferably be slightly less of an adjustment of the installed position (EL) of the membrane spring 6, whereby the increase in the spring force of membrane spring 6 can be essentially maintained.

It should be noted that the contour 20 in the gap 19 can also be curved instead of linear, namely as a function, for example, of the changes in the coefficient of friction on the friction linings 11 over the life of a clutch disc. Friction losses which can occur at the bearing points between the membrane spring 6 and the other components, for example, can also be taken into consideration, as can setting losses of the membrane spring 6 over a long period of time.

In accordance with one embodiment of the present invention, the contour 20 of the gap 19 can include a curve, which curve can be convex with respect to the angle $\beta_1$ of the diagonal surfaces 17 and the mating surfaces 18. In addition, the ring element 16 and the component 18$a$, as shown in FIG. 3$a$, of the wear compensation mechanism 10 can include a tension spring 12.

One feature of the invention resides broadly in the membrane or plate spring clutch, in particular for a motor vehicle, comprising a flywheel fastened to the crankshaft of an internal combustion engine, which flywheel defines an axis of rotation, an application plate which is non-rotational in relation to the flywheel but which can be displaced axially, a clutch disc with friction linings located between the application plate and the flywheel, a membrane or plate spring to apply pressure to the application plate toward the flywheel, a retracting device for the application plate, as well as a mechanism for the automatic adjustment of the membrane or plate spring as a function of the wear of the friction linings, characterized by the fact that the magnitude of the wear adjustment $Y_1$–$Y_3$ can be determined as a function of the application force required on the application plate 5.

Another feature of the invention resides broadly in the membrane or plate spring clutch characterized by the fact that the magnitude of the wear adjustment $Y_1$–$Y_3$ is preferably less than the magnitude of the actual wear $X_1$–$X_2$ which occurs on the fraction linings 11.

Yet another feature of the invention resides broadly in the membrane or plate spring clutch characterized by the fact that there is a mechanism 15, 16 to measure the magnitude of the actual wear $X_1$–$X_2$, which determines the magnitude of the wear adjustment to be made by means of translation 20.

Still another feature of the invention resides broadly in the membrane or plate spring clutch characterized by the fact that the translation ratio is fixed.

A further feature of the invention resides broadly in the membrane or plate spring clutch characterized by the fact that the translation ratio is variable over the total wear.

Another feature of the invention resides broadly in the membrane or plate spring clutch whereby the retracting mechanism comprises a spring mechanism with a spring force which increases in the clutch engagement direction, also comprising a wear adjustment mechanism 10 which acts by means of diagonal surfaces 17, 18 which can be displaced relative to one another, and whereby said mechanism transmits on one hand the application force which originates from the plate spring or membrane spring 6 to the application plate 5, and on the other hand is restricted in its adjustment movement by clearance sensors 13, characterized by the fact that the wear adjustment mechanism 10 comprises an adjustment element 16 which has a diagonal surface 17 opposite a corresponding mating or opposite surface 18 of the application plate 5, and a contour 20 opposite the clearance sensor 13, and the ascending gradients or slopes or inclinations of the two 17, 20 are different from one another, such that the magnitude of the wear adjustment $Y_1$-$Y_3$ with respect to the plate spring or membrane spring 6 is less than the magnitude of the actual wear $X_1$-$X_2$.

Yet another feature of the invention resides broadly in the membrane or plate spring characterized by the fact that the adjustment element is in the form of a ring element 16 which is oriented concentric to the axis of rotation 3, can rotate and upon which pressure is exerted by the spring, and which is in contact by means of preferably a multiplicity of diagonal surfaces 17 distributed over the circumference with corresponding mating surfaces 18 of the application plate 5, which has a discontinuous and concentric contact surface for the plate or membrane spring 6, and which in the gape or breaks or discontinuities 19 comprise areas stop lever 15 of the clearance sensors 13, whereby contours 20 which point in the circumferential direction are provided in the gaps 19 opposite the stop levers 15 of the clearance sensors 13, which contours 20 have an inclination which is opposite to the slope of the diagonal surfaces 17.

Still another feature of the invention resides broadly in the membrane or plate spring clutch characterized by the fact that the contours 20 have an ascending elope which differs over their circumference.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as is set forth in their entirety herein.

Some examples of wear compensation mechanisms which may be utilized in accordance with the present invention may be found in the following U.S. Patents: U.S. Pat. No. 5,238,093 entitled "Wear Indicator for Adjustable Clutch" to Dana Corporation; U.S. Pat. No. 5,263,564 entitled "Adjusting Ring Seal" to Dana Corporation; U.S. Pat. No. 5,265,710 entitled "Hydraulic Self-adjusting Device for Clutch Control Cables" to Pujol y Tarrago; U.S. Pat. No. 5,320,105 entitled "Wear Adjustment for a Clutch" to Dana Corporation; U.S. Pat. No. 5,325,949 entitled "Brake or Clutch unit Wear Adjustment Means" to TI Interlock; U.S. Pat. No. 5,349,882 entitled "Clutch Wear-compensating Compound Flywheel Assembly" to Kabushiki; and U.S. Pat. No. 5,235,898 entitled "Actuator with Wear Compensating Chamber" to Valeo.

Additional examples of wear compensating mechanisms which may be utilized in accordance with the present invention may be found in the following Federal Republic of Germany Patent Applications: DE 42 39 291 A1; DE 44 12 107 A1; and DE 43 06 688 A1.

Types of clutch assemblies which have wear sensors or adjustment mechanisms for detecting and adjusting for the wear of the friction linings of a clutch may be disclosed by the following U.S. Patents: U.S. Pat. No. 4,191,285 to Thelander et al. on Mar. 4, 1980, entitled "Wear Compensator for Belleville Spring Clutch"; U.S. Pat. No. 5,238,093 to Campbell on Aug. 24, 1993, entitled "Wear Indicator for Adjustable Clutch"; U.S. Pat. No. 4,953,680 to Flotow on Sep. 4, 1990, entitled "Clutch Adjuster"; U.S. Pat. No. 4,549,643 to Flotow et al. on Oct. 29, 1985, entitled "Self Adjusting Device for a Friction Clutch"; U.S. Pat. No. 4,310,086 to Mochida on Jan. 12, 1982, entitled "Automatic Adjusting Device for a Clutch Operating Mechanism"; and U.S. Pat. No. 4,285,424 to Sink et al. on Aug. 25, 1981, entitled "Locking Device for a Friction Type Clutch".

Types of manual transmissions in which the present invention may be incorporated may be disclosed by the following U.S. Patents: U.S. Pat. No. 5,036,721 to Gugin on Aug. 6, 1991, entitled "Shift Control Mechanism for a Manual Transmission"; U.S. Pat. No. 4,222,283 to Nagy on Sep. 16, 1980, entitled "Manual Transmission Lubrication System"; U.S. Pat. No. 3,858,460 to Porter et al. on Jan. 7, 1975, entitled "Four Speed Manual Transmission and Control"; and U.S. Pat. No. 5,269,400 to Fogelberg on Dec. 14, 1993, entitled "Transmission Synchronizer".

Types of clutch assemblies in which the present invention may be incorporated may be disclosed by the following United States Patents: U.S. Pat. No. 4,635,780 to Wiggen on Jan. 13, 1987, entitled "Clutch Disc for a Motor Vehicle Friction Clutch"; U.S. Pat. No. 4,684,007 to Maucher on Aug. 4, 1987, entitled "Clutch Plate"; U.S. Pat. No. 4,433,771 to Caray on Feb. 28, 1984, entitled "Torsion Damping Device for a Clutch Plate"; and U.S. Pat. No. 4,099,604 to Higgerson on Jul. 11, 1978, entitled "Friction Clutch with Integral Adjuster".

Some examples of leaf springs which may be utilized in accordance with the present invention may be found in the following U.S. Patents: U.S. Pat. No. 5,284,234 entitled "Centrifugal Clutch"; U.S. Pat. No. 4,222,473 entitled "Four Way Pawl Clutch" to General Motors; U.S. Pat. No. 4,257,510 entitled "Non-linear Spring Rate Clutch Damper" to Borg-Warner; U.S. Pat. No. 4,271,951 entitled "Check Valve Apparatus for Oil Pressure Operated Clutch" to Honda; U.S. Pat. No. 4,278,161 entitled "Coupling Arrangement for an Electromagnetic Clutch" to Facet; and U.S. Pat. No. 4,305,492 entitled "Clutch Release Device" to Kabushiki.

The corresponding foreign patent publication applications, namely, Federal Republic of Germany Patent Application No. P 44 40 412.3, filed on Nov. 11, 1994, having inventor Reinhold Weldinger, and DE-OS P 44 40 412.3 and DE-PS P 44 40 412.3, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A clutch for a motor vehicle, said clutch having a rotational axis, said clutch comprising:

a pressure plate;

friction lining means;

a spring;

said spring being disposed to generate a force of engagement on said pressure plate to bring said pressure plate in contact with said friction lining means;

wear adjustment means;

said wear adjustment means being substantially disposed between said spring and said pressure plate;

said wear adjustment means having an axial width;

the axial width of said wear adjustment means changing according to a predetermined force-displacement characteristic upon said friction lining means wearing from an intially installed positon to a worn position;

said wear adjustment means comprising a first ring member;

said first ring member comprising:
  a first side;
    said first side of said first ring member being disposed adjacent to said spring;
  a second side; and
    said second side of said first ring member being disposed opposite said first side of said first ring member;

said wear adjustment means comprising a second ring member;

said second ring member comprising:
  a first side;
    said first side of said second ring member being disposed adjacent to said pressure plate;
  a second side; and
    said second side of said second ring member being disposed opposite said first side of said second ring member;

at least a portion of said second side of said first ring member being disposed to contact at least a portion of said second side of said second ring member;

said at least a portion of said second side of said first ring member and said at least a portion of said second side of said second ring member being configured to vary the axial width of said wear adjustment means upon relative rotation of said first ring member with respect to said second ring member;

said first ring member having at least one notch;

said at least one notch extending through the radial thickness of said first ring member;

said at least one notch being disposed along said first side of said first ring member;

said at least one notch having a substantial angular width with respect to the rotational axis;

said at least one notch comprising:
  a first notch edge portion;
    said first notch edge portion having a first axial width;
  a second notch edge portion;
    said second notch edge portion having a second axial width;
    said first notch edge portion being disposed from said second notch edge portion by the substantial angular width of said at least one notch; and
    the first axial width being substantially different than the second axial width;

said at least one notch comprising at least one contoured portion;

said at least one contoured portion having an angular width with respect to the rotational axis substantially equal to the angular width of said at least one notch;

said wear adjustment means comprising wear sensing means for sensing a wear of said friction lining means;

said wear sensing means comprising means for limiting a change in the axial width of said wear adjustment means to be less than the wear of said friction lining means;

said wear sensing means comprising a projection;

said projection being disposed to extend into said at least one notch;

a portion of said projection being disposed within said at least one notch; and said portion of said projection having a surface disposed to operatively contact a portion of said at least one contoured portion to limit the rotation of said first ring member with respect to said second ring member.

2. The clutch according to claim 1, wherein:

said wear sensing means comprises means for changing the axial width of said wear adjustment means according to a predetermined relationship with the wear of said friction lining means;

the predetermined axial width-friction lining means wear relationship comprises one of the following a) and b):
  a) a constant translation relationship, wherein the change in the axial width of said wear adjustment means divided by the wear of said friction lining means is substantially constant over the life of said friction lining means; and
  b) a varying translation relationship, wherein the change in the axial width of said wear adjustment means divided by the wear of said friction lining means is substantially non-constant over the life of said friction lining means.

3. The clutch according to claim 2, wherein:

said clutch further comprises a flywheel;

said friction lining means is disposed between said pressure plate and said flywheel; and said wear sensing means comprises:
  at least one hole disposed in said pressure plate;
  said at least one hole extends through said pressure plate;
  said at least one hole is disposed generally parallel with the rotational axis;
  said at least one hole is disposed radially outward of said wear adjustment means;
  at least one pin;
  said at least one pin is disposed in said at least one hole of said pressure plate;
  said at least one pin comprises a first end and a second end;
  said first end of said at least one pin being disposed to contact said flywheel upon engagement of said clutch;
  said second end of said at least one pin is disposed opposite said first end of said at least one pin;
  said projection comprises a lever;
  said lever is disposed adjacent said second end of said at least one pin;
  said lever is attached to said second end of said at least one pin;
  at least one sleeve;
  said at least one sleeve of said wear sensing means is disposed about said at least one pin;
  said at least one sleeve is movable with respect to said at least one pin; and
  said at least one sleeve comprises means for permitting relative axial motion of said pressure plate with respect to said wear sensing means.

4. The clutch according to claim 3 wherein:

said at least a portion of said second side of said first ring member and said at least a portion of said second side of said second ring member each comprises:
  a first end portion;
  a second end portion;
  said first end portion is disposed a substantial angular width from said second end portion;

said first end portion is disposed a substantial axial distance from said second end portion; and said first end portion and said second end portion define a plane oriented at a first oblique angle with respect to the axis of rotation;

the plane corresponding to said first ring member is oriented substantially adjacent to the plane corresponding to said second ring member; and the plane corresponding to said first ring member is oriented substantially parallel to the plane corresponding to said second ring member.

5. The clutch according to claim 4, wherein:

said first notch edge portion comprises a first end;

said first end of said first notch edge portion is disposed substantially opposite said first side of said first ring member;

said second notch edge portion comprises a first end;

said first end of said second notch edge portion is disposed substantially opposite said first side of said first ring member;

said first end of said first notch edge portion and said first end of said second notch edge portion define a further plane;

the further plane is disposed at a second oblique angle with respect to the rotational axis; and said at least one notch is configured wherein the second oblique angle is substantially different than the first oblique angle.

6. The clutch according to claim 5, wherein:

said portion of at least one contoured portion comprises a contoured surface;

said contoured surface is disposed at the second oblique angle with respect to the rotational axis;

said contoured surface comprises one of the following a) and b):
  a) a substantially smooth planar surface; and
  b) a surface having portions that are curved and do not lie on a common plane; and said at least a portion of said second side of said first ring member and said at least a portion of said second side of said second ring member each comprises at least one of the following a) and b):
  a) a substantially smooth planar surface disposed substantially along the first oblique angle; and
  b) a plurality of stepped surfaces extending along the first oblique angle.

7. The clutch according to claim 6, wherein:

said clutch further comprises means for applying a biasing force to disengage said pressure plate from said friction lining means;

said means for applying a biasing force applies a biasing force in a substantially opposite direction from the force of engagment applied by said spring;

a net engaging force applied to said pressure plate from said spring substantially equals the difference between the force of engagement and the biasing force;

said means for applying a biasing force comprises means for applying a biasing force that increases in magnitude with the wear of said friction lining means;

said spring is disposed and configured to generate an increased force of engagement upon an increase in the axial width of said wear adjustment means; and said predetermined axial width-friction lining means wear relationship is configured for said spring to generate a substantially constant net engaging force on said pressure plate.

8. The clutch according to claim 7, wherein:

said first side of said first ring member is in contact with said spring;

said first side of said second ring member is non-rotationally attached to said pressure plate;

said spring comprises one of a membrane spring and a plate spring;

said wear adjustment means further comprises ring element biasing means for biasing one of said first ring member and said second ring member to rotate with respect to the other of said first ring member and said second ring member upon the wear of said friction lining means;

said ring element biasing means comprises at least one tension spring;

said at least one tension spring is operatively connected to said first ring member to rotate said first ring member during disengagement of said clutch following an engagement of said clutch wherein wear of said friction lining means has occurred; and said first ring member rotates to incrementally increase the axial width of said wear adjustment means.

9. A motor vehicle clutch having wear adjustment, said clutch having a rotational axis, said clutch comprising:

a pressure plate;

friction lining means;

engagement means for applying an engagement force to operatively contact said pressure plate against said friction lining means;

said engagement means comprising a spring;

said spring being disposed to generate a force of engagement on said pressure plate;

said spring being disposed a distance from said pressure plate;

wear adjustment means for changing the distance of said spring being displaced from said pressure plate according to a predetermined force-displacement characteristic upon said friction lining means wearing from an initially installed position to a worn position;

said wear adjustment means comprising wear sensing means for sensing the wear of said friction lining means;

said wear sensing means comprising means for changing the distance between said spring and said pressure plate according to a predetermined relationship with the wear of said friction lining means;

said friction lining means having a first thickness upon said friction lining means being in an initially installed position;

said friction lining means having a second thickness upon the wearing of said friction lining means;

the difference between the first thickness and the second thickness representing a wear of said friction lining means;

the distance between said spring and said pressure plate upon said friction lining means being in an initially installed position representing a first spring distance;

the distance between said spring and said pressure plate upon said friction lining means wearing from the first thickness to the second thickness representing a second spring distance;

the difference between the first spring distance and the second spring distance representing a wear adjustment;

said wear sensing means comprising means for limiting the wear adjustment to be less than the wear of said friction lining means;

said friction lining means having a third thickness upon further wearing of said friction lining means from the second thickness;

the distance between said spring and said pressure plate upon said friction lining means wearing from the second thickness to the third thickness representing a third spring distance;

the difference between the second thickness and the third thickness representing an incremental wear of said friction lining means;

the difference between the third spring distance and the second spring distance representing an incremental wear adjustment;

the predetermined distance-friction lining means wear relationship comprising one of the following a) and b):
  a) a constant translation relationship, wherein the incremental wear adjustment divided by the incremental wear being substantially constant over the life of said friction lining means, and
  b) a varying translation relationship, wherein the incremental wear adjustment divided by the incremental wear being substantially non-constant over the life of said friction lining means;

said clutch further comprising a flywheel;

said friction lining means being disposed between said pressure plate and said flywheel;

said wear adjustment means comprising an adjusting element;

said adjusting element being disposed substantially between said spring and said pressure plate;

an end of said adjusting element being disposed adjacent said spring;

an opposite end of said adjusting element being disposed adjacent said pressure plate;

each end of said adjusting element being disposed substantially perpendicular to the axis of rotation;

said adjusting element having an adjustable axial width;

said adjusting element comprising a first ring member and a second ring member;

an end of said first ring member comprising said end of said adjusting element;

an end of said second ring member comprising said opposite end of said adjusting element;

an opposite end of said first ring member being disposed to contact an opposite end of said second ring member;

a portion of each of said opposite ends of said first ring member and said second ring member comprising an adjusting surface;

at least a portion of said adjusting surface of said first ring member being disposed to contact at least a portion of said adjusting surface of said second ring member;

said adjusting surface of said first ring member and said adjusting surface of said second ring member being configured to vary the axial width of said adjusting element upon relative rotation of the first ring member with respect to the second ring member;

said wear adjustment means further comprising means for biasing one of said first ring member and said second ring member to rotate with respect to the other of said first ring member and said second ring member upon wear of said friction lining means;

said wear sensing means comprising:
  at least one hole being disposed in said pressure plate;
  said at least one hole extending through said pressure plate;
  said at least one hole being disposed generally parallel with the rotational axis;
  said at least one hole being disposed radially outward of said adjusting element;
  at least one pin;
  said at least one pin being disposed in said at least one hole of said pressure plate;
  said at least one pin comprising a first end and a second end;
  said first end of said at least one pin being disposed to contact said flywheel upon engagement of said clutch;
  said second end of said at least one pin being disposed opposite said first end of said at least one pin;
  a lever;
  said lever being disposed adjacent said second end of said at least one pin;
  said lever being attached to said second end of said at least one pin;
  stop means for limiting the rotation of said first ring member with respect to said second ring member; and
  said stop means comprising:
    said lever;
    said lever extending radially inward from said at least one pin; and
    said lever being disposed to operatively contact one of said first ring member and said second ring member to limit relative rotation of said first ring member with respect to said second ring member;

each adjusting surface of said first ring member and said second ring member comprising:
  a first circumferential end portion;
  a second circumferential end portion;
  said first circumferential end portion being disposed a substantial angular width from said second circumferential end portion;
  said first circumferential end portion being disposed a substantial axial distance from said second circumferential end portion; and
  said first circumferential end portion and said second circumferential end portion defining a plane oriented at a first oblique angle with respect to the axis of rotation;

the plane corresponding to said first ring member being oriented substantially adjacent to the plane corresponding to said second ring member;

the plane corresponding to said first ring member being oriented substantially parallel to the plane corresponding to said second ring member;

said first ring member comprising at least one notch;

said at least one notch extending through the radial thickness of said first ring member;

said at least one notch being disposed along said first side of said adjusting element;

said at least one notch having an angular width with respect to the rotational axis;

said at least one notch comprising:
  a first notch edge portion;
  said first notch edge portion comprising a first end;
  said first end of said first notch edge portion being disposed substantially opposite said end of said first ring member;

said first notch edge portion having a first axial width;
a second notch edge portion;
said second notch edge portion comprising a first end;
said first end of said second notch edge portion being disposed substantially opposite said end of said first ring member;
said second notch edge portion having a second axial width;
the first axial width being disposed from the second axial width by the angular width of said at least one notch;
the first axial width being substantially different than the second axial width;
said first end of said first notch edge portion and said first end of said second notch edge portion defining a further plane; and
the further plane being disposed at a second oblique angle with respect to the axis of rotation;
said first ring member comprising at least one contoured portion;
said at least one contoured portion being disposed immediately adjacent to said at least one notch;
said lever of said at least one pin being disposed to extend into said at least one notch;
a portion of said lever being disposed within said at least one notch; and
said lever portion having a surface disposed to operatively contact a portion of said at least one contoured portion to limit the rotation of said first ring member with respect to said second ring member.

10. The clutch according to claim 9, wherein:
said at least one contoured portion has a contoured surface immediately adjacent said at least one notch;
said contoured surface comprises said portion disposed to operatively contact said lever;
the peripheral width dimension of said contoured surface is disposed at the second oblique angle with respect to the rotational axis;
said at least one notch is configured wherein the second oblique angle is substantially different than the first oblique angle;
said contoured surface comprises one of the following a) and b):
  a) a substantially smooth planar surface; and
  b) a surface having portions that are curved and do not lie on a common plane;
said contoured surface of said first ring member is disposed between said notch and said adjusting surface of said first ring member;
said contoured surface comprises a first stop surface;
said lever portion comprises a second stop surface; and
each of said first stop surface and said second stop surface is configured to correspond to the predetermined distance-friction lining means wear relationship.

11. The clutch according to claim 10, wherein:
the first oblique angle of said first and second ring members represents a positive gradient with respect to the axis of rotation;
said at least one notch is configured whereby the second oblique angle of said at least one notch forms a negative gradient with respect to the axis of rotation;
said opposite end of said first ring member comprises a plurality of adjusting surfaces disposed about the circumference of said opposite end of said first ring member;
said opposite end of said second ring member comprises a plurality of adjusting surfaces disposed about the circumference of said opposite end of said second ring member;
said clutch further comprises means for applying a biasing force to disengage said pressure plate from said friction lining means;
the biasing force acts substantially opposite in direction from the engaging force;
a net engaging force applied to said pressure plate from said spring substantially equals the difference between the engaging force and the biasing force;
said biasing force means comprises means for applying a biasing force that increases in magnitude with wear of said friction lining means;
said spring is disposed and configured to generate an increase in engagement force upon an increase in the distance between said spring and said pressure plate;
said first ring member is in contact with said spring;
said second ring member is non-rotatively attached to said pressure plate;
said spring comprises one of a membrane spring and a plate spring;
said wear adjustment means further comprises adjusting element biasing means for biasing relative rotation of said first ring member with respect to said second ring member;
said adjusting element biasing means comprises tension spring means;
said tension spring means are operatively connected to said first ring member to rotate said first ring member during disengagement of said clutch following an engagement of said clutch wherein wear of said friction lining means has occured; and
the direction of rotation of said first ring member incrementally increases the axial width of said adjusting element.

12. The clutch according to claim 11, wherein:
each of said adjusting surfaces of said first ring member and said second ring member comprises at least one of the following a) and b):
  a) a substantially smooth plane surface disposed substantially along the first oblique angle; and
  b) a plurality of stepped surfaces extending along the first oblique angle;
said wear sensing means further comprises at least one sleeve;
said at least one sleeve of said wear sensing means is disposed about said at least one pin;
said at least one sleeve is movable with respect to said at least one pin;
said at least one sleeve comprises means for permitting relative axial motion of said pressure plate with respect to said wear sensing means;
said spring comprises a force-displacement characteristic wherein said spring operatively generates an increase in the magnitude of the engagement force upon an increase in the distance between said spring and said pressure plate; and
said predetermined wear adjustment-friction lining means wear relationship is configured to generate a substantially constant net engagement force on said pressure plate.

13. A motor vehicle clutch having wear adjustment, said clutch having a rotational axis, said clutch comprising:

a pressure plate;

friction lining means;

engagement means for applying an engagement force to operatively contact said pressure plate against said friction lining means;

said engagement means comprising a spring;

said spring being disposed to generate a force of engagement on said pressure plate;

said spring being disposed a distance from said pressure plate;

wear adjustment means for changing the magnitude of the engagement force of said spring transmitted to said pressure plate according to a predetermined force-displacement characteristic upon said friction lining means wearing from an initially installed position to a worn position;

said wear adjustment means comprising distance adjustment means for displacing said spring to change the distance between said spring and said pressure plate upon said friction lining means wearing from an initially installed position to a worn position;

said friction lining means having a first thickness upon said friction lining means being in an initially installed position;

said friction lining means having a second thickness upon said friction lining means wearing to a worn position;

the difference between the first thickness and the second thickness representing a wear of said friction lining means;

the distance between said spring and said pressure plate upon said friction lining means being in an initially installed position being a first distance;

the distance between said spring and said pressure plate upon said friction lining means wearing to a second thickness being a second distance;

the difference between the second distance and the first distance representing a wear adjustment;

said distance adjustment means comprising means for limiting the wear adjustment to be substantially less than the wear of said friction lining means;

said distance adjustment means comprising wear sensing means for sensing the wear of said friction lining means;

said wear sensing means comprising means for changing the magnitude of the wear adjustment according to a predetermined wear adjustment-friction lining means wear relationship upon said friction lining means wearing from an initially installed position to a worn position;

said friction lining means having a third thickness upon further wearing of said friction lining means from the second thickness;

the distance between said spring and said pressure plate upon said friction lining means wearing to the third thickness being a third distance;

the difference between the second thickness and the third thickness representing an incremental wear of said friction lining means;

the difference between the third distance and the second distance representing an incremental wear adjustment;

the predetermined spring distance-friction lining means wear relationship comprising one of the following sets a) and b):

a) a constant relationship, wherein the incremental wear adjustment divided by the incremental wear is substantially constant over the life of said friction lining means; and b) a varying relationship, wherein the incremental wear adjustment divided by the incremental wear is substantially non-constant over the life of said friction lining means;

said distance adjustment means comprising an adjustable-width device;

said adjustable-width device being disposed substantially between said spring and said pressure plate for transmitting the engagement force from said spring to said pressure plate;

said adjustable-width device comprising a first adjusting member and a second adjusting member;

each of said first adjusting member and said second adjusting member being configured to vary the width of said adjustable-width device upon relative displacement of said first adjusting member with respect to said second adjusting member;

each of said first adjusting member and said second adjusting member comprising an adjusting surface;

at least a portion of said adjusting surface of said first adjusting member being disposed to contact at least a portion of said adjusting surface of said second adjusting member;

said first adjusting member comprising a first portion and a second portion;

said first portion of said first adjusting member comprising a first surface of said adjusting surface of said first adjusting member;

said second portion of said first adjusting member comprising a second surface of said adjusting surface of said first adjusting member;

said first portion of said first adjusting member having a width defined parallel to the axis of rotation;

said second portion of said first adjusting member having a width defined parallel to the axis of rotation;

the width of said first portion of said first adjusting member being greater than the width of said second portion of said first adjusting member;

said second adjusting member comprising a first portion and a second portion;

said first portion of said second adjusting member comprising a first surface of said adjusting surface of said second adjusting member;

said second portion of said second adjusting member comprising a second surface of said adjusting surface of said second adjusting member;

said first portion of said second adjusting member having a width defined parallel to the axis of rotation;

said second portion of said second adjusting member having a width defined parallel to the axis of rotation;

the width of said first portion of said second adjusting member being greater than the width of said second portion of said second adjusting member;

said first surface of said first portion of said first adjusting member being disposed to contact said second surface of said second portion of said second adjusting member;

said second surface of said second portion of said first adjusting member being disposed to contact said first surface of said first portion of said second adjusting member;

said first and second surfaces of said first adjusting member and said first and second surfaces of said second adjusting member having a peripheral length dimension;

the peripheral length dimension being oriented to form a first oblique angle with respect to the axis of rotation;

one of said first adjusting member and said second adjusting member comprising at least one notch;

said at least one notch having an angular width with respect to the axis of rotation;

said one of said first adjusting member and said second adjusting member comprising at least one contoured portion;

said at least one contoured portion being disposed immediately adjacent said at least one notch;

said at least one contoured portion comprising a first stop surface;

said first stop surface being disposed immediately along said at least one notch;

said wear sensing means comprising at least one clearance sensor;

a portion of said at least one clearance sensor being disposed at least partially within said at least one notch;

said portion of said at least one clearance sensor comprising a second stop surface; and a portion of said second stop surface being disposed to operatively contact a portion of said first stop surface to limit extension of said adjustable-width device.

14. The clutch according to claim 13, wherein:

said at least one notch has a circumferential width;

said at least one notch has a first axial width and a second axial width;

the first axial width of said at least one notch is separated from the second axial width of said at least one notch by the circumferential width of said at least one notch;

the first axial width of said at least one notch is substantially different than the second axial width of said at least one notch;

an end of said first axial width is disposed immediately adjacent said corresponding contoured portion;

an end of said second axial width is disposed immediately adjacent said corresponding contoured portion;

said end of said first axial width of said at least one notch is separated from said end of said second axial width of said at least one notch by a substantial axial distance;

the ends of said first axial width and said second axial width of said at least one notch define a plane oriented at a second oblique angle with respect to the axis of rotation;

the second oblique angle is substantially different than the first oblique angle;

said contoured surface comprises one of the following a) and b):
 a) a substantially smooth planar surface; and
 b) a curved surface having portions that do not lie in a common plane.

15. The clutch according to claim 14, wherein:

said first adjusting member is a first ring member;

said second adjusting member is a second ring member;

said first ring member is rotatable with respect to said second ring member for adjusting the width of said adjustable-width element;

said first ring member is disposed adjacent said spring;

said second ring member is non-rotationally connected to said pressure plate;

said at least one notch is disposed within said first ring member;

the first oblique angle of said adjusting surfaces represents a positive gradient angle with respect to the axis of rotation; and said at least one notch is configured whereby the second oblique angle of said at least one notch is oriented to form a negative gradient with respect to the axis of rotation.

16. The clutch according to claim 15, wherein:

said spring is one of: a membrane spring and a plate spring;

said first ring member comprises a plurality of said adjusting surfaces distributed about the circumference of said first ring member;

said second ring member comprises a plurality of said adjusting surfaces distributed about the circumference of said second ring member;

said clutch further comprises biasing means for applying a biasing force to said pressure plate to disengage said pressure plate from said friction lining means;

the biasing force transmitted to said pressure plate acts substantially opposite in direction from said engagement force transmitted to said pressure plate;

said biasing means comprises means for applying a biasing force that increases in magnitude upon wear of said friction lining means from an initially installed position to a worn position;

said wear adjustment means further comprises tensioning means for rotating said first ring member relative to said second ring member following an engagement of said clutch wherein wear of said friction lining means has occurred;

said tensioning means comprises at least one tension spring; and said at least one tension spring is operatively connected to said first ring member to increase the width of said adjustable-width device upon wear of said friction lining means.

17. The clutch according to claim 16, wherein:

each of said adjusting surfaces of said first ring member and each of said adjusting surfaces of said second ring member comprises at least one of the following a) and b):
 a) a substantially smooth plane surface comprising the corresponding first and second surfaces of said first and second ring members; and
 b) a plurality of stepped sufaces extending along and between the corresponding said first and second surfaces of said first and second ring members;

said wear sensing means further comprises:
 at least one hole disposed in said pressure plate;
 said at least one hole extends through said pressure plate;
 said at least one hole is disposed generally parallel with the rotational axis;
 said at least one hole is disposed radially outward of said adjustable-width device;
 said clearance sensor comprises at least one pin;
 said at least one pin is disposed in said at least one hole of said pressure plate;
 at least one sleeve;
 said at least one sleeve is disposed about said at least one pin;

said at least one sleeve is movable with respect to said at least one pin;

said at least one sleeve comprises means for permitting relative axial motion of said pressure plate with respect to said at least one pin;

said at least one pin comprises a first end and a second end;

said first end being disposed to contact said flywheel upon engagement of said clutch;

said second end is disposed opposite said first end;

a lever;

said lever is disposed adjacent said second end of said pin;

said lever is attached to said second end of said pin;

said lever is disposed to to radially extend into a notch of said first ring member; and said lever comprises said second stop surface;

a net engagement force applied to said pressure plate substantially equals the difference in magnitude between the engagement force and the biasing force; and the predetermined wear adjustment-friction lining means wear relationship is configured to generate a substantially constant net engagement force on said pressure plate.

* * * * *

UNITED STATES PATENT AND TRADEMARK OFFICE
CERTIFICATE OF CORRECTION

PATENT NO. : 5,645,154
DATED : July 8, 1997
INVENTOR(S) : Reinhold WEIDINGER

It is certified that error appears in the above-identified patent and that said Letters Patent is hereby corrected as shown below:

In column 6, lines 41-43, after 'another' delete ", for example, as discussed hereinbelow with reference to FIG. 3b' ".

Signed and Sealed this

Twentieth Day of January, 1998

Attest:

BRUCE LEHMAN

Attesting Officer

Commissioner of Patents and Trademarks